United States Patent [19]

Down et al.

[11] Patent Number: 4,738,009

[45] Date of Patent: Apr. 19, 1988

[54] COAXIAL CABLE TAP

[75] Inventors: William J. Down, Freeville; Melvin Acker, Horseheads, both of N.Y.

[73] Assignee: LRC Electronics, Inc., Horseheads, N.Y.

[21] Appl. No.: 881,590

[22] Filed: Jul. 2, 1986

Related U.S. Application Data

[63] Continuation of Ser. No. 472,191, Mar. 4, 1983, abandoned.

[51] Int. Cl.$^4$ ..................... B23B 41/00; H01R 13/40
[52] U.S. Cl. ..................... 29/33 M; 408/72 R; 408/103; 408/241 B; 439/391; 439/425
[58] Field of Search ................ 29/33 R, 33 M; 408/72 R, 72 B, 103, 109, 115 R, 115 B, 241 B, 241 G; 339/96, 97 R; 439/391, 425

[56] References Cited

U.S. PATENT DOCUMENTS

| | | | |
|---|---|---|---|
| 2,363,085 | 11/1944 | Roye | 408/72 B |
| 2,687,560 | 8/1954 | Palley | 408/97 |
| 2,694,182 | 11/1954 | Edlen et al. | 339/97 R |
| 2,694,183 | 11/1954 | Edlen et al. | 339/97 R |
| 2,805,399 | 9/1957 | Leeper | 339/97 R |
| 3,543,222 | 11/1970 | Rheinfelder | 339/99 R |
| 3,602,872 | 8/1971 | Braunstein | 339/97 R |
| 3,625,623 | 12/1971 | Rheinfelder | 408/97 |
| 3,795,757 | 3/1974 | Higgins | 174/72 R |
| 3,848,955 | 11/1974 | Lockie et al. | 339/97 R |
| 4,120,554 | 10/1978 | Bianchi et al. | 339/97 R |
| 4,450,621 | 5/1984 | Bianchi | 408/97 |

Primary Examiner—Eugene F. Desmond
Assistant Examiner—Daniel W. Howell
Attorney, Agent, or Firm—Weingarten, Schurgin, Gagnebin & Hayes

[57] ABSTRACT

A connector and cable preparation fixture to provide a coaxial cable tap while the cable continues to pass signals. The apparatus of the present invention attaches the cable tap without shorting the conductors and without significantly changing the coaxial cable parameters which would affect the data flow therein. The fixture described herein provides a guide for a cutting operation and for the subsequent assembly of the finished connector. The connector includes a cable tap which mounts on the coaxial cable in a perpendicular manner, and a center pin which attaches to the coaxial cable center wire along the axis of the cable tap. The center pin has two prongs spaced apart in opposition to straddle the center conductor. The connector is easily installed with no measurements. The resulting connection has a long and reliable life without causing an interruption to information or signal flow on the cable at any time.

13 Claims, 3 Drawing Sheets

COAXIAL CABLE TAP

This application is a continuation of application Ser. No. 472,191, filed Mar. 4, 1983, now abandoned.

FIELD OF THE INVENTION

The present invention relates to electrical cable connectors, and in particular coaxial cable "T" connectors.

BACKGROUND OF THE INVENTION

Connections to coaxial cables for RF signals and computer data information traditionally have been provided by splicing into the cable. One way of providing such splicing is to sever the cable and affix a male connectors on each of the severed cable. A terminal block having three female connections, all connected in parallel is provided to receive the two spliced ends and to provide the additional signal path. Not only does this interrupt the signal path, causing an interruption in the data or signal transfer service, but also requires many expensive machined connector parts, and can only be performed by skilled technicians. Moreover, if this connector is to be used in the external environment, each of those connectors requires a particular method of weatherproofing.

A second approach commonly used in the data network style coaxial connections is to clamp the cable in a fixture having two jaws, thus securing the cable therebetween. One of the two jaws has a threaded opening to receive a conical cable piercing signal probe along an axis perpendicular to the cable. The signal probe is then screwed into the cable to first displace the outer shield. The tip then proceeds through the dielectric of the cable until it comes in contact with the cable center conductor. However, since the probe provides a unilateral pressure on the center conductor of the cable, the pressure between the probe tip and the center conductor decreases with time due to material relaxation. Moreover, if the tap is not carefully applied, or if the cable suffers from variations in the alignment of the elements, such as the placement of the center wire, a signal probe will not properly contact the center cable. Additionally, while the probe tip is piercing the outer conductive shield, portions of it may be pulled through the dielectric, shorting out the center conductor. This short circuit condition, which may be temporary, can nonetheless cause a critical and serious disruption of service.

Another cable connector includes a second cable-piercing probe in contact with the center conductor and disposed in opposition to the signal probe. The additional probe may be spring loaded to provide a constant force on the center conductor, and therfore a constant force between the center conductor and the signal probe. However, this too introduces a possibility of another temporary short circuit-condition during installation, and critically relies on the accuracy of the position of the cable center conductor. Moreover, the application of each cable piercing pin presents a capacitive load to the cable of at least five picofarads, which may place an undesired load on the cable.

Drilling fixtures have also been suggested to reduce the additional capacitance or the likelihood of short circuits. However, since the axis of the drill is aligned perpendicular to the center wire so that the signal pins coincide therewith, the depths by which the cable is drilled, and location of the cable drill is critical, and must be carefully measured or controlled.

The above mentioned connectors and the associated installation procedures are cumbersome, expensive, require skilled personnel, and have questionable life times.

BRIEF DESCRIPTION OF THE INVENTION

The apparatus of the present invention provides a relatively inexpensive cable connector providing a quick and reliable connection which does not interrupt the signal flow in the cable to which the tap is affixed. Moreover, the cable connector maybe applied by untrained personnel, who are not required to make any measurements or perform any complex procedures. Moreover, the present invention is tolerant to cable manufacturing irregularities, and maintains constant characteristics over an extended life span.

The connector of the present invention includes a screw-in tip to engage the coaxial cable along an axis perpendicular to the axis of the coaxial cable, and includes material piercing elements to engage the desired conductor portions thereof. The cable connection is first prepared by removal of a predetermined amount of the coaxial cable outer shield and dielectric material, without contact to the center conductor. Tight tolerances and accuracy are maintained by the use of a fixture or other clamping means which includes a supporting cable shoe located within the fixture in a position opposite to the surface of the cutting tool; subsequently, the cutting shoe then is used as the bottom piece of the finished connector and is removed from the fixture. Each cable connector lower portion is placed in the cutting fixture for the cutting procedure. In this manner, each cutting operation is performed with a newly manufactured support structure, whose tolerances are not degraded by extended use. Moreover, high accuracy and secure connector retention is provided by assembling the connector in the same fixture which provided the cable preparation, as well as using the fixture piece for part of the finished connector.

After cutting, the T-connector is assembled by mating a complementary connector part to the lower shoe, forming a two-piece cable connector clamp securing the cable therebetween. The upper portion includes a plurality of conductive pins to pierce the plastic covering of the cable to make contact with the shield. The upper piece further comprises a threaded opening to receive a threaded cable connector. The threaded cable connector includes a center pin to make contact with the center conductor of the cable. The tip of the center pin which engages the center conductor of the cable has parallel axial extensions to pierce the remaining portions of the cable dielectric. Moreover, the center pin is self-aligning with the center conductor as the coaxial cable connector is screwed into the top connector piece. After the coaxial cable connector is inserted in and fully seated against and within the upper connector piece, the "T" connection is finished and may be placed in service.

BRIEF DESCRIPTION OF THE DRAWING

These and other features of the present invention will be better understood from the following detailed description taken together with the drawing, wherein.

DETAILED DESCRIPTION OF THE DRAWING

Figure 1:
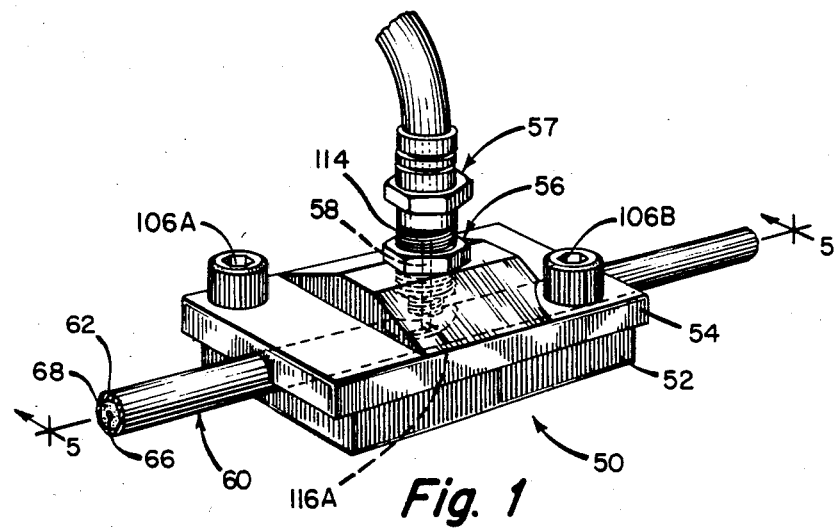
FIG. 1 is a perspective of the connector of the pin installed on a coaxial cable.

A perspective cut away of the connector 50 of the present invention is shown in FIG. 1, which includes a bottom piece 52, a top 54 and a screw-in coaxial cable connector 56 received by the top piece 54. The coaxial cable connector 50 is electrically and mechanically secured to a coaxial cable 60. The coaxial cable 60 includes a center conductor 66, an outer concentric shield 62, a cable dielectric insulator 68, and a protective outer coating 64. The screw-in coaxial cable connector 56 includes a center contact 58 to connect mechanically and electrically to the center conductor 66 within the body of the connector 50, described below in detail. According to the present invention, the center pin 58 of the screw-in cable connector 56 engages the center conductor 60 without shorting to the shield 62 of the cable 60. In order to provide this feature, the cable is prepared by selectively removing a portion of the cable shield and a limited portion of the dielectric 68.

Figure 2:
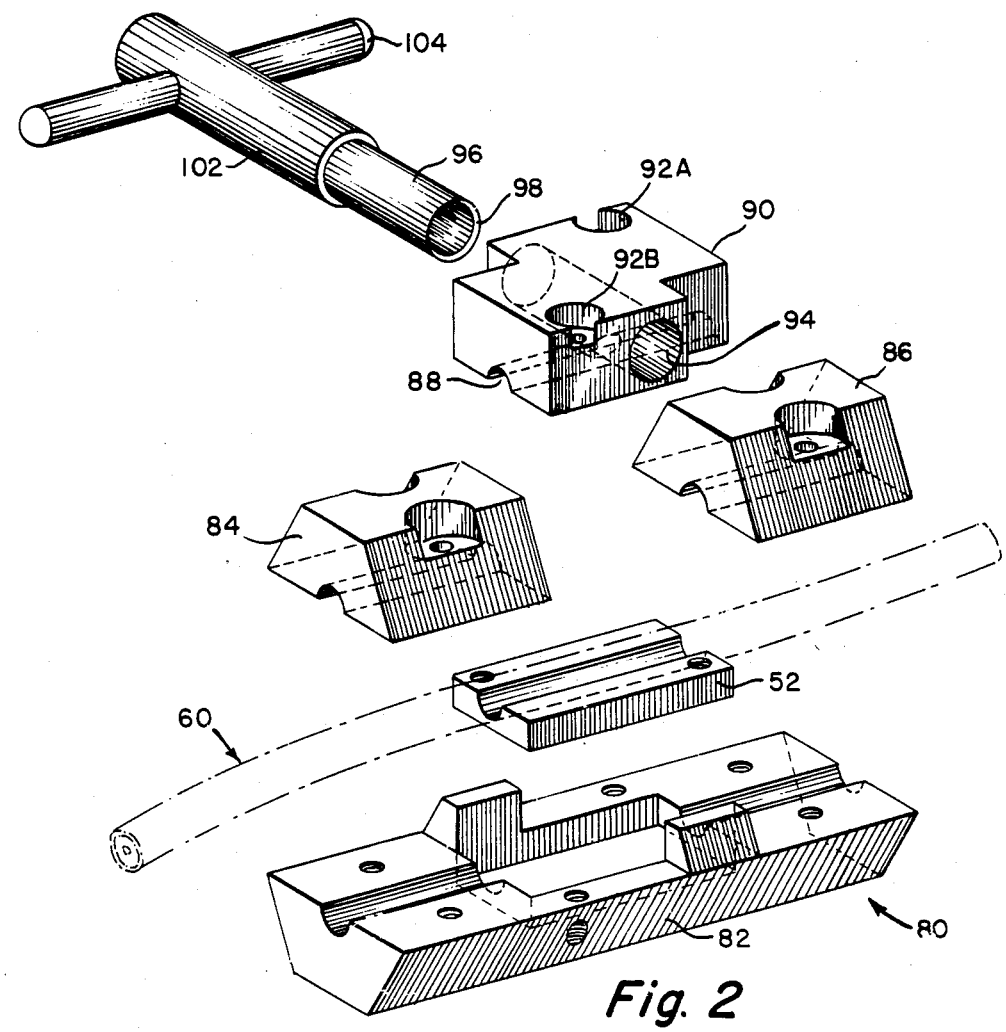
FIG. 2 is an exploded view of the connector cutting fixture, and cutting-tool.

The fixture necessary to provide such preparation is shown in FIG. 2. The base plate 82 of the fixture 80 and cable clamp elements 84 and 86 retain the cable 60 therebetween. A cable shoe 52, to become the lower part of the finished cable connector 54 as described below, is inserted within the base plate 82 to support the cable 60 from below, and between the end pieces 84 and 86. The end pieces 84 and 86 are secured to the base plate 82 by screw fasteners (not shown) or other suitable means providing the necessary compressive forces to retain the cable 60. A cutting block 90 has a concave surface 88 to complement a portion of the exterior surface of the cable 60. The cutting block 90 is positioned above the shoe 52 which together substantially surround the cable 60, and provide compressive retention forces on the coaxial cable therebetween. The cutting block 90 is secured by screw fastener means 92A and 92B, or other suitable means. An opening 94, perpendicular to the axis of the cable 60, receives a cutting tool 96, discussed further below. The axis of the opening 94, laterally displaced from the axis of the cable 60, allows the front surface 98 of the cutting tool 96 to tangentially engage the cable 60, selectively removing a portion thereof. Appreciating that the concentric shield 68 of the cable 60 is typically composed of either a metal foil or a wire braid, and that either may easily stretch or fragmentize during splicing operations, short circuits are prevented in the present invention wherein the cutting surface 98 cuts through the coaxial cable without exposing the center conductor 66. In a subsequent step, the coaxial cable connector 56 connects to the center conductor 66 of the cable 60 through the dielectric 68. According to the present invention, the cutting tool 96 and the cutting surface 98 as well as the opening 94 are circular. The axis of the opening 94 (and the cutting tool 96) is laterally displaced from the axis of the coaxial cable 60 as retained between the shoe 52 and the cutting block 90 so as not to permit the cutting edge 98 or any portion of the cutting tool 96 to come in contact with the center conductor 66 of the coaxial cable 60 during cutting operation.

Figure 3:
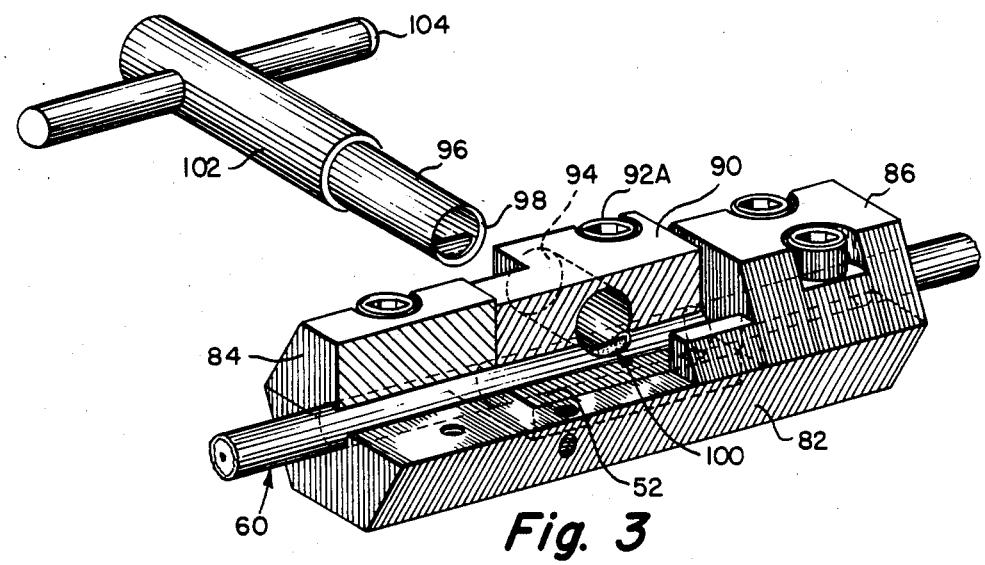
FIG. 3 is a pictorial view partially cut-away of the cutting fixture and cutting-tool showing the cut cable.

A perspective view of the cutting fixture 80 together with the cutting tool 96 is shown in FIG. 3. The cutter 96 is shown withdrawn, having provided the desired cut 100, in the coaxial cable 60. The cutting surface 98 of the cutter 96 comprises a concave interior section with a sharpened exterior cutting surface. The cutting tool 96 has a raised outer shoulder portion 102 to limit the extension into the cutting block 90 during operations for safety precautions. A perpendicular handle 104 is provided for operator ease of use, and other handle means are possible as desired. It is noted that the cable opening 100 (before the connector 56 is attached) shows the dielectric 68 without the center conductor 66 exposed in the area of the cut 100. It is the intent of the present invention that the cable may be maintained in service while the cable preparation is in progress, as well as while the subsequent cable connector components are affixed.

Figure 4:
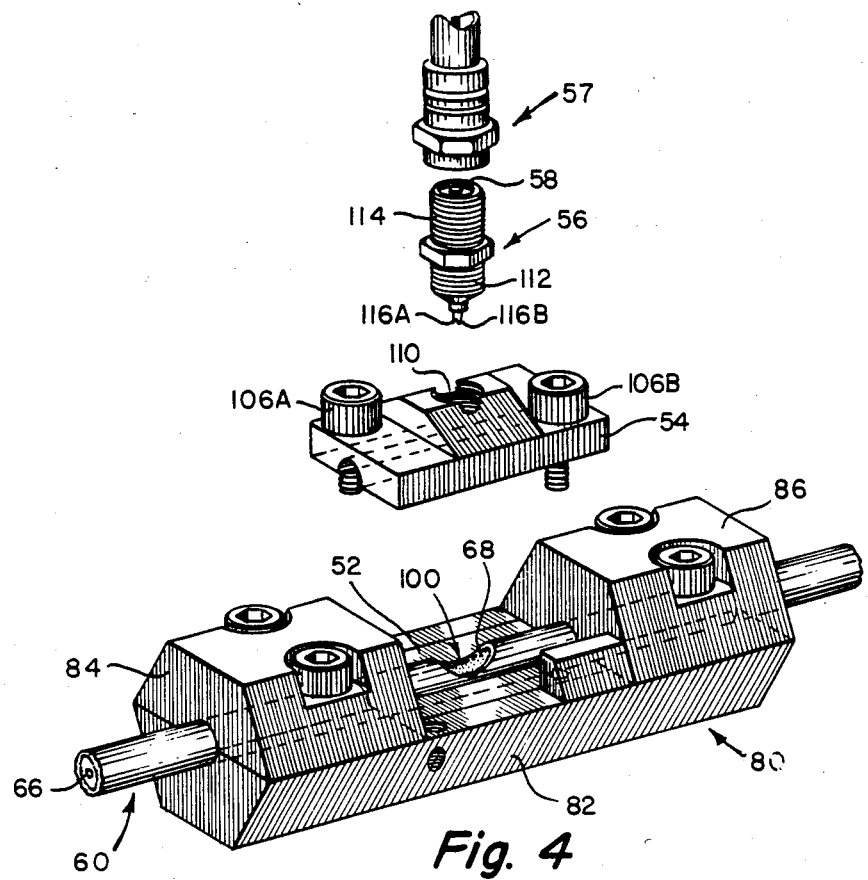
FIG. 4 is an exploded view of the fixture in use as a connector assembly guide.

In order to provide precise alignment and assembly of the finished connector 50, the fixture 80 of the present invention is also used as a guide to the assembly process, as shown in FIG. 4. The upper piece 54 of the connector 50 is positioned above the lower piece 52, while the cable 60 is retained within the fixture 80 by screw fasteners 106A and 106B, or other means, as desired. The upper piece 54 also contains cable cover 64 piercing pins (not shown) in order to secure electrical and mechanical connection between the shield 66 and the upper piece 54. The fasteners 106A and 106B are advanced until the pieces 52 and 54 are in complete contact, at which point the joining of the pieces 52 and 54 to the coaxial cable 60 is complete. Thereafter, the cable 60, together with the affixed pieces 52 and 54, are removed from the fixture 80.

The upper piece 54 of the connector 50 includes a threaded opening 110 to receive the threaded connector piece 56 having a complementary set of threads 112 thereon. The connector 56 also includes a cable mating connector end 114 having screw 57, BNC or other style common to the data and RF technologies as desired. The threaded cable connector 56 is screwed into the threaded opening 110 of the upper piece 54 until completely seated. While the connector 56 is screwed into the connector opening 110, the center pin 58, having two laterally opposed surfaces 116A and 116B, enters the coaxial cable 60 through the opening 100 and displaces the dielectric materials 68 to come in contact with to electrically and mechanically secure connection with the center conductor 66, as discussed below. According to the feature of the present invention, the connector 56 may be inserted without measurement or adjustment, since the dual tips 116A and 116B of the center pin 58 are self-aligning during the assembly process.

Figure 5:
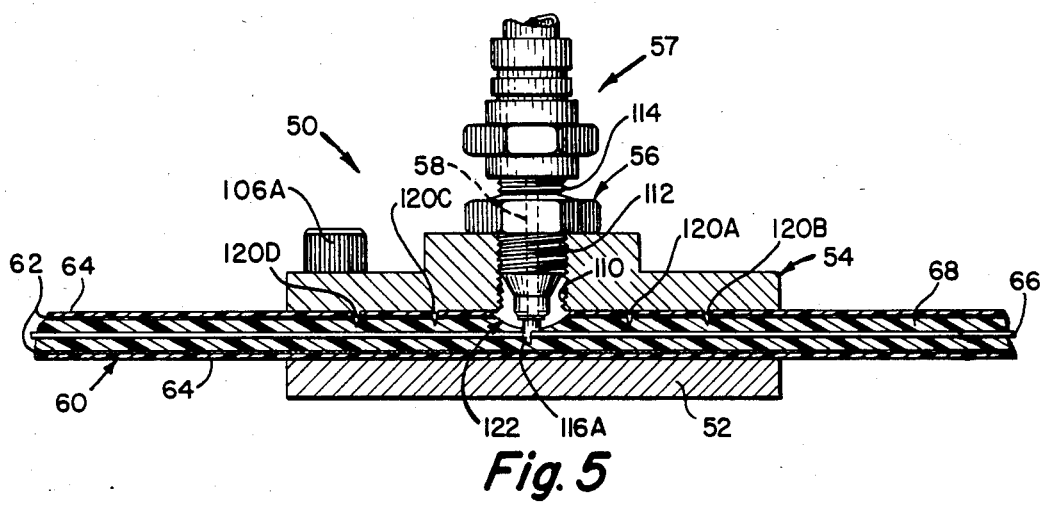
FIG. 5 is a section through 5—5 of FIG. 1, showing the cable connector interacting with the cable.

A detailed perspective cutaway of the cable connector 56 engaging the coaxial cable 60 is shown in FIG. 5. As seen in this figure, the two tips 116A and 116B (116B obscured) extend through the dielectric material 68 to partially surround and retain the center wire 66 in secure electrical and mechanical contact. By application of laterally opposing connector tips 116A and 116B, connection to the center conductor is made without placing unilateral stresses thereon, which may relax or change through time. Furthermore, the distance the laterally opposing contacts 116A and 116B is slightly smaller (by 0.003 inch typically) than the diameter of the center conductor 66. Also shown in FIG. 5 are four shield piercing pins or spikes 120A, 120B, 120C, and 120D. Four pins are selected; however, more or fewer may be used. The piercing pins 120A, 120B, 120C, and 120D form a firm electrical and mechanical connections (124A, 124B, 124C and 124D in FIG. 6, below) to the shield 62 of the cable 60 when the lower connector piece 52 and the upper piece 54 of the connector 50 are attached as described above.

Figure 6:
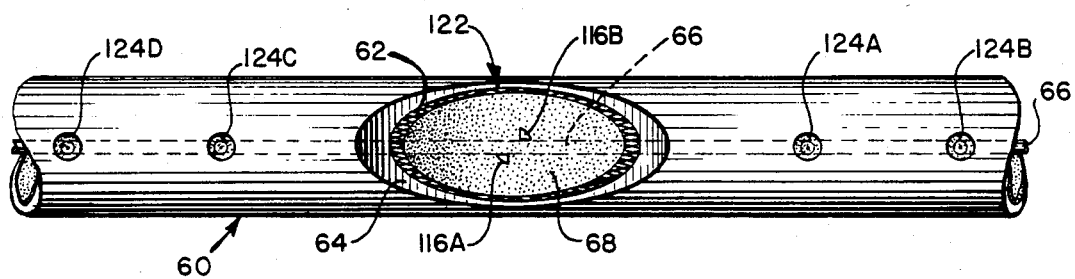
FIG. 6 is a top view of the cable connector showing the contact points to the center pin.

A top view of the cable within the connector of the present invention is shown in FIG. 6. The cable 60 having been prepared, shows the aperture 122 providing a wide distance from the severed edge of the shield 62 and the contact areas of the pins 116A and 116B of the connector. It can be appreciated that until the connector 56 is applied, the dielectric 68 is smooth and without opening, providing easy preassembly inspection, if desired.

Figures 7A, 7B, 7C:
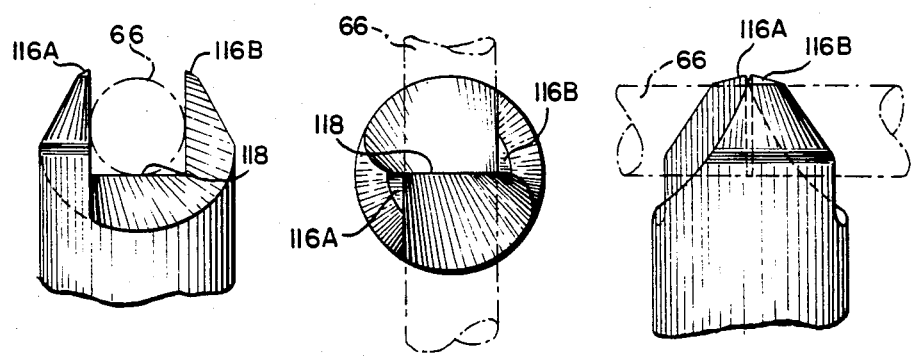
FIGS. 7A-7C are three view of the contact center pin.

The center pin 58 is shown in FIGS. 7A–7C, wherein the laterally opposing pins or tips 116A and 116B can be seen in detail. The tips 116A and 116B include edges in opposition across the diameter at the wire to provide the desired mechanical and electrical connection thereto. More particularly, the criterion for proper operating tips 116A and 116B of pin 58, according to the present invention, are that the tips 116A and 116B slightly compress to displace the center conductor 66 material. Also, a third contact surface 118 on a line besetting the location of the two contact pairs 116A and 116B be provided to provide three contact surfaces between the center conductor 66 and the center pin 58.

The present invention is not limited by the above solely exemplary detailed description. Modifications and substitutions by those skilled in the art are considered within the scope of the present invention. Therefore, the present invention is not to be considered limited except by the following claims.

What is claimed is:

1. For use in providing electrical connection to a coaxial cable without signal interruption thereto and wherein the coaxial cable has a center conductor, an outer conductor and a dielectric therebetween, and said cable has a longitudinal axis, apparatus comprising:
   a cable connector clamp including:
      a base plate;
      a lower shoe removably disposed in the base plate;
      the base plate and lower shoe having an elongated recess for acceptance of a coaxial cable therealong;
      first and second end pieces removably attached to the base plate in spaced relation for retaining the coaxial cable in the elongated recess;
      the portion of the coaxial cable between the end pieces being disposed for access;
      a cutting block disposable in the portion between the end pieces and including fastener means for removably securing the cutting block to the base plate;
      the cutting block having a transverse opening therethrough, extending along an axis orthogonal to the axis of the coaxial cable disposed in the cable connector clamp, and intersecting the outer conductor of the coaxial cable and a portion of the dielectric material between the outer conductor and the center conductor of the coaxial cable;
      the transverse opening of the cutting block being operative to receive and guide a cutting tool insertable through the opening and operative to remove a portion of the outer conductor and a portion of the dielectric between the outer conductor and center conductor of the coaxial cable without contacting the center conductor of the coaxial cable;
      a top piece disposable in the portion between the end pieces of the connector clamp after removal of the cutting block and including fastener means for securing the top piece to the lower shoe for retention of the coaxial cable between the top piece and lower shoe, said top piece including means for providing electrical connection to the outer conductor;
      a coaxial connector fitting secured to the top piece and having a center pin extending through the dielectric in the removed area of the cable to radially engage the center conductor of the cable;
      the base plate and end pieces being removable from the cable after securing the top piece and lower shoe to the cable.

2. The apparatus of claim 1, wherein
said transverse opening and cutting tool each have a surface curved about an axis offset from the center conductor of the coaxial cable for removing a concave portion of said dielectric.

3. The apparatus of claim 2 wherein the base plate has a centrally disposed opening configured to receive the lower shoe;
   the end portions of the base plate and lower shoe having elongated recesses therealong which form a continuous recess with the lower shoe disposed in the base plate for acceptance of the coaxial cable.

4. The apparatus of claim 3 wherein the lower shoe includes one or more threaded openings disposed outwardly of the recess;
   wherein the cutting block includes one or more openings therethrough cooperative with the threaded openings of the lower shoe for acceptance of threaded fasteners; and
   wherein the top piece includes one or more openings therethrough in alignment with the threaded openings of the lower shoe for acceptance of threaded fasteners.

5. The apparatus of claim 1 wherein the coaxial connector fitting includes a threaded outer portion for mating with a standard coaxial connector.

6. The apparatus of claim 1 wherein the coaxial connector fitting includes a center pin having at the distal end thereof a pair of spaced tips spaced to engage the center conductor.

7. The apparatus of claim 6 wherein the tips of the center pin are operative to displace the dielectric material of the coaxial cable.

8. The apparatus of claim 7 wherein the tips of the center pin each have plural knife edges to mechanically and electrically engage confronting portions of the center conductor.

9. The apparatus of claim 8 wherein the tips of the center pin are operative to provide self-aligning of the center pin to the center conductor.

10. The apparatus of claim 1 wherein the top piece has a plurality of outwardly extending pins operative to pierce the outer conductor of the coaxial cable retained between the top piece and lower shoe for providing electrical connection to the outer conductor.

11. The apparatus of claim 1 wherein the coaxial connector fitting includes a first portion threaded to mate with a threaded opening through the top piece.

12. Apparatus for providing connection to a coaxial cable, comprising:
- a lower shoe permanently retaining a longitudinal portion of said coaxial cable;
- a cutting block temporarily mating with said lower shoe to retain said cable therebetween, the cutting block having a transverse opening therethrough, extending along an axis orthogonal to the axis of the coaxial cable disposed in the lower shoe, and intersecting the outer conductor of the coaxial cable and a portion of the dielectric material between the outer conductor and the center conductor of the coaxial cable, the transverse opening of the cutting block being operative to receive a cutting tool insertable through the opening and operative to remove a portion of the outer conductor and a portion of the dielectric between the outer conductor and center conductor of the coaxial cable without contacting the center conductor of the coaxial cable;
- means for temporarily retaining said lower shoe and said cutting block in mating relationship; and
- a top piece disposable to permanently mate with said lower shoe after removal of the cutting block, and including fastener means for securing the top piece to the lower shoe for retention of the coaxial cable between the top piece and lower shoe, said top piece including means for providing electrical connection to said outer conductor and means for providing electrical connection to said inner conductor.

13. A coaxial cable connector for providing electrical connection to a coaxial cable without signal interruption thereto, comprising:
- a cable cutter guide having an elongated recess which peripherally intersects the coaxial cable and through which a cable cutter moves to remove a peripheral portion of said coaxial cable;
- a cable shoe;
- means for retaining said cable shoe in alignment with said cable cutter guide;
- a connector top piece for matingly engaging said cable shoe about the cable; and
- a cable center conductor tap retained by said connector top piece to radially engage the center conductor of said coaxial cable at an angle orthogonal to said recess.

* * * * *